(12) United States Patent
Aggarwal et al.

(10) Patent No.: US 6,728,706 B2
(45) Date of Patent: Apr. 27, 2004

(54) SEARCHING PRODUCTS CATALOGS

(75) Inventors: Gaurav Aggarwal, New Delhi (IN); Sugata Ghosal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 09/815,614

(22) Filed: Mar. 23, 2001

(65) Prior Publication Data

US 2002/0138481 A1 Sep. 26, 2002

(51) Int. Cl.$^7$ ............................................. G06F 17/30
(52) U.S. Cl. ............................................................ 707/5
(58) Field of Search ............................ 707/3, 5, 6, 100

(56) References Cited

U.S. PATENT DOCUMENTS

| | | | |
|---|---|---|---|
| 4,996,642 A | | 2/1991 | Hey |
| 5,666,442 A | | 9/1997 | Wheeler |
| 5,724,567 A | * | 3/1998 | Rose et al. .................... 707/2 |
| 6,041,311 A | * | 3/2000 | Chislenko et al. ............ 705/27 |
| 6,334,127 B1 | * | 12/2001 | Bieganski et al. .............. 707/5 |
| 6,412,012 B1 | * | 6/2002 | Bieganski et al. .......... 709/232 |
| 6,463,433 B1 | * | 10/2002 | Baclawski ..................... 707/5 |
| 6,487,539 B1 | * | 11/2002 | Aggarwal et al. ............ 705/14 |

OTHER PUBLICATIONS

I. Vollrath, W. Wilke, and R. Bergmann, "Intelligent Electronic Catalogs for Sales Support", Department of Computer Science, University of Kaiserslautern, http://wwwagr.informatik.uni–kl.de/, 1999, 13 pages.

\* cited by examiner

*Primary Examiner*—Safet Metjahic
*Assistant Examiner*—Haythim J. Alaubaidi
(74) *Attorney, Agent, or Firm*—McGinn & Gibb, PLLC; T. Rao Coca, Esq.

(57) ABSTRACT

Searching online catalog databases by shoppers is improved by performing similarity searching on searches performed by the shopper, in conjunction with adjusting the similarity metric used during the search to interactively improve the relevance of the resulting search results to the shopper. This involves using relevance feedback and/or product redefinition to learn the "implied concept" of the shopper's stated product requirements; that is, the quality of the search results is enhanced through understanding the concept implied by the shopper's queries by, for example, learning from the product results marked as "relevant" or "irrelevant" by the shopper. This approach is in contrast with attempts to enhance search results using, for example, the shopper's past orders or previous actions, or the past orders or previous actions of other shoppers who may have a purchase history similar to that of the current shopper.

27 Claims, 5 Drawing Sheets

SEARCHING PRODUCTS CATALOGS

FIELD OF THE INVENTION

The invention relates to searching product catalogs and relates particularly, though not exclusively, to improved methods suitable for allowing shoppers to effectively search online product catalogs of items able to purchased from a retailer.

BACKGROUND OF THE INVENTION

With the growing popularity of e-commerce, searching online catalogs for products has become an important problem for both online retailing for business to consumer (B2C) as well as business to business (B2B) trading portals. These Web sites are virtual shops that have searchable catalogs providing product details.

A shopper may either browse through the various products for sale, or select products by specific product identification numbers. When using conventional product catalogs, the shopper may either (a) know the appropriate product identification number, for example, when ordering a replacement item; (b) be looking for items similar to some item in mind, for example, when looking for a shirt; or (c) be browsing with no specific product in mind but hoping to make up her mind as she looks through the range of products available for sale, for example, when shopping for a gift.

Prior-art commerce systems like WebSphere™ Commerce Suite from IBM, Open Market™ from Open Market Inc, and Broad Vision™ from Broad Vision Inc save product information as numeric and nominal values in a database. These product attributes form a high-dimensional space where each product occupies a unique point. Exact, partial and range queries may be performed using vectors from this space to retrieve products, and present them to the shopper.

Typically, the shopper wants to search for products by description, that is, product attributes rather than by product identification numbers since these may differ from store to store. Further, she may want to browse through the catalog and explore the various possibilities to decide what suits her requirements. It is often not practical or convenient to do exact searches on catalog databases due to several reasons. As a consequence, similarity searching has been proposed to enable "vague" or "fuzzy" querying of the product catalog. However, one limitation of such systems is that different shoppers have different notions of similarity from one another. Hence, two products may be similar to each other in one shopper's perception but another shopper may find them quite different. The use of fixed similarity metrics to evaluate closeness of two products has limitations since it cannot capture the subjectivity of shoppers' product requirements. For example, a shopper may find a Toyota Camry motor vehicle similar to a Volkswagen Wagon since their engines have similar horsepower, but another shopper find a Honda Accord more similar to the Camry since they are both sedans.

Another key limitation of existing commerce systems is their inability to capture the rich content available in pictures of the actual product. Typically, details about visual properties of products such as appearance, colour distribution, texture and so on, are represented by keywords and stored in a multi-attribute product catalog. However, there are cases in which keywords cannot adequately describe product characteristics such as floral prints, upholstery patterns, jewellery designs and so on. Further, describing visual characteristics is often a subjective process and hence it is not possible to appropriately associate unique keywords from pictures of products to enable a search based on a product's visual appearance. Thus, if a shopper wants to search upholstery that looks similar to a pattern that a shopper has with her, then an annotation-based catalog does not work well, as the shopper may not be able to describe the pattern in words. She may have to browse through the catalog for her requirements even though she has a pattern in her mind.

U.S. Pat. No. 4,996,642 (Hey), titled "System and method for recommending items", discloses a system in which a user is recommended a product, such as a movie title in a video store, based on the similarity of the current user and other users. This system is built on the hypothesis that if two users have generally bought similar things in the past, then they will tend to buy similar products in future.

However, any given shopper typically has different product requirements at different times and hence, such recommendations cannot effectively be made depending solely on her and/or other shoppers' previous responses. Such systems are based on the shoppers' histories and profiles, and are thus "state-less", that is, the shopper's interaction with the system during a shopping session is not used to recommend items or find items closer to her requirements.

U.S. Pat. No. 6,041,311 (Chislenko et al), titled "Method and apparatus for item recommendation using automated collaborative filtering", discloses a collaborative filtering approach to product recommendation. It is claimed that content-based systems do not work well and hence products must be matched only at the higher level. Though feature selection and extraction remains a difficult problem, partial solutions do exist for specific domains. In particular, extensive research in image and video analysis has resulted in acceptable automatic feature extraction methods. These methods work even better when assisted by an expert.

U.S. Pat. No. 5,666,442 (Wheeler), titled "Comparison system for identifying the degree of similarity between objects by rendering a numeric measure of closeness, the system including all available information complete with errors and inaccuracies", discloses a method of similarity searching where attributes can be weighted by the user and where the all items may not have all the feature attributes. This work has been incorporated in the "Similarity Search Engine" from Infoglide Inc, a search engine that returns a rank-order list of items weighted according to the preferences given by the user at query time. The results are ranked with the items most closely matching the search criteria at the top of the list. The system allows the results of multiple databases searches to be brought together. In such a system, the user has to explicitly give the weights for each search criteria. This can make the system difficult to use, especially if the features used for searching can not be adequately understood by the user. Further, this system is better suited to cases in which a definite object is being searched (for example, a criminal record from a police database). However, while shopping, a shopper may start with only an approximate query and arrive at decision only after exploring the product offerings from the store, such as when selecting a gift.

Ivo Vollrath, Wolfgang Wilke, and Ralph Bergmann present a case-based reasoning approach to product selection using intelligent online catalogs in *Intelligent Electronic Catalogs for Sales Support: Introducing Case-Based Reasoning Techniques to On-Line Product Selection Applications*, R. Roy, T. Furuhashi, P. K. Chawddhry, (Eds.): Advances in Soft Computing—Engineering Design and Manufacturing, Springer-Verlag, London, 1999. The described system, however, expects the user to weigh the relative importance of different attributes during the search process.

None of the above product search approaches outlined above are rigorously optimal or universally applicable for use in presenting product information to shoppers. Accordingly, it is an object of the invention to at least attempt to address these and other limitations associated with the prior art. In particular, it is an object of the invention to generally improve the results provided to those searching online databases, such as retail product catalogs.

SUMMARY OF THE INVENTION

The inventive concept resides in a recognition that the searching of online catalog databases by shoppers is advantageously improved by performing similarity searching on searches performed by the shopper, in conjunction with adjusting the similarity metric used during the search to interactively improve the relevance of the resulting search results to the shopper. Preferably, this involves using relevance feedback and/or product redefinition in an attempt to learn the "implied concept" of the shopper's stated product requirements. That is, the inventive concept involves an attempt to understand the concept implied by the shopper's stated requirements to enhance the quality of the search results to the shopper, rather than attempting to enhance search results using, for example, the shopper's past orders or previous actions, or the past orders or previous actions of other shoppers.

It is recognised that shoppers can often be thought of having a latent implied concept that is not particularly suitable or able to be readily expressed or presented to a search interface of a product catalog. In contrast with the prior art, a state of the shopper's actions is maintained during a search or query session, but not used across different shopping sessions of the same or different shoppers.

More particularly, the inventive concept involves using similarity searches for querying product catalogs, and relevance feedback techniques and product specification modification to learn the shopper's requirements iteratively and interactivity rather than expecting her, for example, to explicitly identify and weight product various attributes which may or may not be of particular interest. The inventive concept also uses techniques from content-based image retrieval systems to enable product searches based on their visual properties. In particular, product specification modification provides a method of personalising products whereby the shopper may modify the approximate product attributes and visually inspect the changes before placing an order for the modified product, or using the modified product as a basis for further catalog searching.

Preferred embodiments of the invention address conventional limitations of the prior art by providing for personalised product catalog searches in a multi-attribute space using a similarity metrics and relevance feedback. Preferred embodiment also allows a shopper to search using the product images. The inventive embodiments also infer the shopper's requirement and allow a shopper to visually verify the effects of modifying existing products.

Accordingly, in one aspect, the invention provides a method of providing to a user an interactive product search facility suitable for searching product information stored in a product catalog, the method comprising the steps of:

(a) providing a database of records respectively describing products, each of said records including a plurality of fields containing respective field values which characterise said products;

(b) receiving from a user a request to search said database of records in the form of a query based on one or more of said fields;

(c) providing to the user an initial set of similar search records found as a result of a similarity search based on said search request;

(d) receiving from the user relevance feedback as to which of said similar search records are of greater and/or lesser relevance to the user compared with other similar search records;

(e) providing to the user a modified set of similar search results found as a result of a similarity search based on (i) said search request, and (ii) said relevance feedback;

wherein said modified set of similar search results provides to the user records which are generally of greater relevance to said user than said initial set of similar search results.

The search requests involve numeric and nominal product attributes, as well as product image attributes, where appropriate.

Similarity searches are performed on the basis of similarity functions, and different similarity functions are used for nominal and non-nominal attributes. The similarity function for numeric product attributes is Mahalanobis distance, more particularly a weighted Euclidean distance measure. Relative weights are assigned to respective attributes to represent the relative importance of that attribute in the similarity function.

In preferred embodiments, providing sets of similar search records involves multimodal similarity matching of numeric, nominal and image product attributes.

The relevance feedback received from the user is used to automatically adjust the relative weights assigned to respective product attributes to retrieve search results that are closer to the concept implied by the user's search query and relevance feedback. Preferably, steps (c) and (d) may be performed a plurality of times.

The initial set of similar search results includes K-nearest neighbours using the designated similarity function. The relevance feedback involves an indication from the user, for one or more of the results in the set of similar search results, whether the result is relevant, irrelevant, or indifferent. On the basis of the relevance feedback, the similarity function, or parameters thereof, are modified so that the results of the modified similarity search provide the modified set of similar search results which better matches those of the initial set of similar search results designated relevant or irrelevant.

In an alternative embodiment, the initial set of similar search results is not the K-nearest neighbours, but are quite different from each other and the query point, to assist in catalog exploration, and to better orient the similarity function to the shopper's implied concept.

Before providing an initial set of similar search results, a number of similar product specifications are generated automatically, by modifying for each product one product attribute. Shopper feedback is received for these modified products, in order to adjust the query point and learn the similarity metric that is most suitable, prior to conducting a similarity search.

DETAILED DESCRIPTION OF EMBODIMENTS AND BEST MODE

An embodiment of the invention is described in relation to the accompanying drawings which outline the methods and systems of product catalog searching in accordance with the invention.

Figure 1:
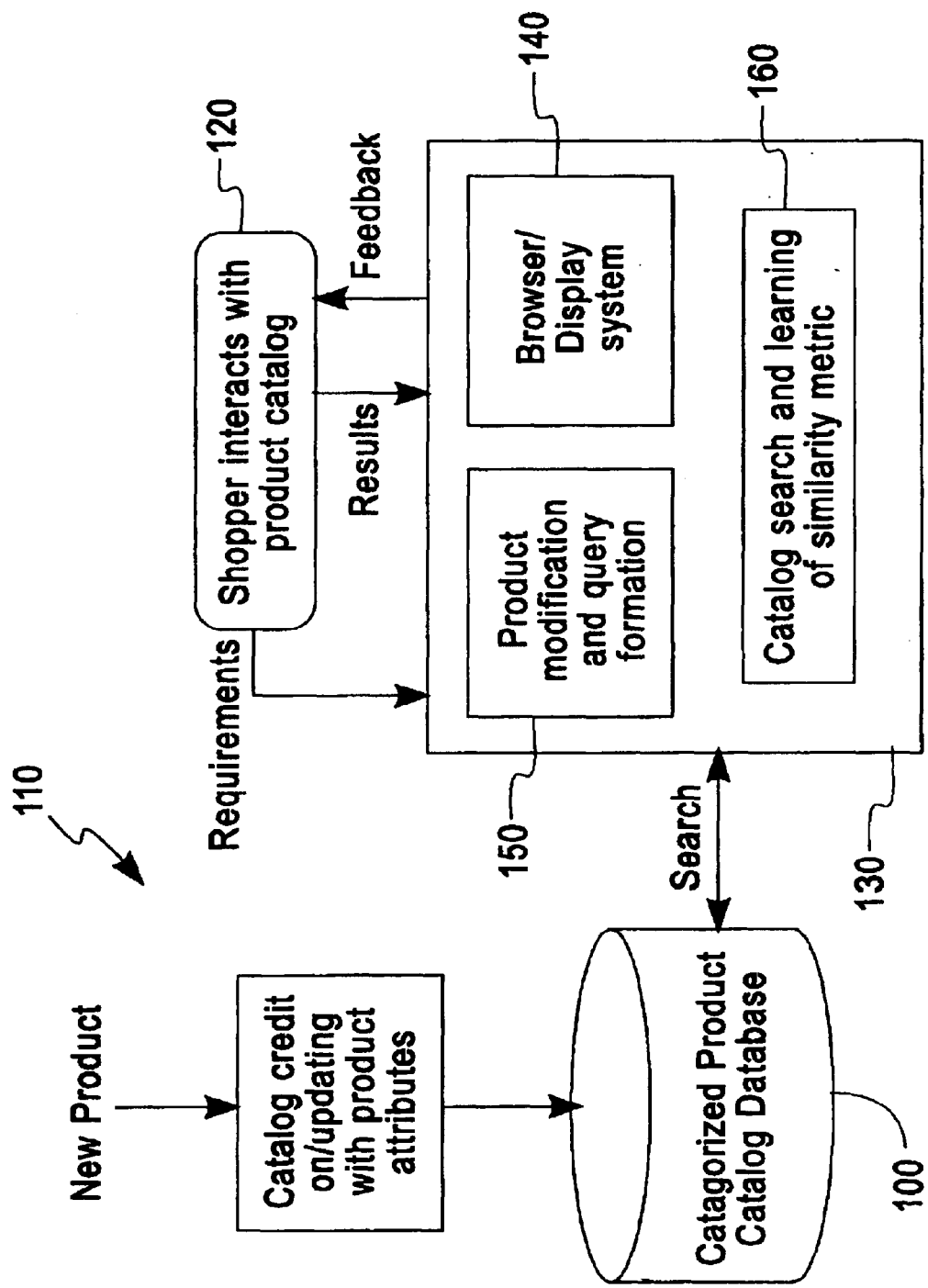
FIG. 1 is a schematic diagram of a system for performing a method of catalog searching according to an embodiment of the invention.

An embodiment of the invention is described in overview with reference to FIG. 1. The system maintains a product catalog 100 of product details for all items available in the store, whether real or virtual, as represented in step 110. The catalog is stored using any suitable prior art database organisation techniques. A shopper wishing to purchase products from the store communicates with the store's commerce system 130 through mechanisms such as, for example, the Internet or shopping kiosks, represented by step 120, through suitable browser/display system 140. The system may verify the identity of the shopper using, for example, a username and password over a secure network protocol, or allow the user to browse selections as a guest shopper.

This starts a shopping session where the shopper begins with choosing some category from the shop to browse or search, such as, for example, apparel, electronics, music etc. The shopper goes through a phase of product selection. Conventionally, when the shopper is satisfied with the product selection(s), the shopper proceeds to checkout the items and pays in any usual way, for example, by credit card. The store delivers the goods to the address given by the shopper during checkout.

The described embodiment relates to the methods used to improve the shopping experience for the shopper by providing a capability of "similarity searches" with relevance feedback and product redefinition during product selection, indicated by 150 and 160. These searches are able to be done on both numeric and nominal product attributes as well as the product images, when appropriate.

By way of explanation, nominal attributes are those that take one value out of a fixed set of possible values, for example, sedan, convertible, hatchback etc. for the "body style" attribute for cars. Numeric attributes are those that have a numeric value, for example, miles per gallon for the "fuel consumption" attribute for cars. Similarity searching gives the shopper an opportunity to explore various products that are similar or most like the products that she has in mind. This type of searching is found to be especially useful when the shopper has a certain notion of for what she is looking, but does not know the exact product specification, or wishes to browse through similar products before making a final selection.

It may be considered that the shopper's product searching conveys an "implied concept", which the system attempt to learn. The system learns the concept implied by the shopper's current requirements rather than recommending products based on the shopper's previous actions or those of other shoppers who, for example, in the past bought products similar to those being searched by the current shopper. Similarity searching is performed by computing a similarity (or dissimilarity) score for each object (product) in the product database from the user query object using a similarity function. The objects in the database are ranked according to their similarity scores and the top few matches are shown to the shopper. One such similarity measure for numeric values is the Mahalanobis distance, $d(x,q)$, defined as:

$$S(f_j) = d(x,q) = (x-q)^T M(x-q) = \Sigma_j \Sigma_k m_{jk}(x_j - q_j)(x_k - q_k)$$

where q is the query vector and x is a target vector in the database and M is an nXn matrix that defines the generalised ellipsoid distance, when there are n product attributes. A special case of the Mahalanobis distance measure is the weighted Euclidean distance measure where the off-diagonal entries of the matrix are all zero. The weighted Euclidean distance measure then assumes the form:

$$S(f_j) = d(x,q) = \Sigma_i w_i (x_i - q_i)^2$$

where the summation is over the n-dimensional feature (attribute) space. The weights $w_i$ give the relative importance of the i-th attribute over other attributes. A large value of $w_i$ indicates that the corresponding attribute is quite important while a small value, denotes that the attribute is of lesser importance.

Typically, existing product catalogs in commerce systems store product images along with the textual description. These images are shown to the shopper on request, but the images are not used during product searching. However, the described embodiment uses the product image together with numeric and nominal product attributes to capture the information available in the visual appearance of the product. Numeric attributes extracted from the product image are used together with other attributes during the similarity search for products.

A key difficulty reported by existing content-based image searching systems is feature selection and extraction. There is no single set of features that works well for all different categories of images. Different techniques are required for capturing the visual information in images. For example, texture techniques such as Wold decomposition, Wavelet transform, Gabor filters are required to capture the texture present in images of upholstery or tapestry, while colour features such as RGB or HSV colour histograms are required for images of flowers along with shape features such as invariant moments or Fourier coefficients. Thus, a general purpose image search system has been hard to develop that works on all categories at one time.

Product Catalog Creation

Figure 2:
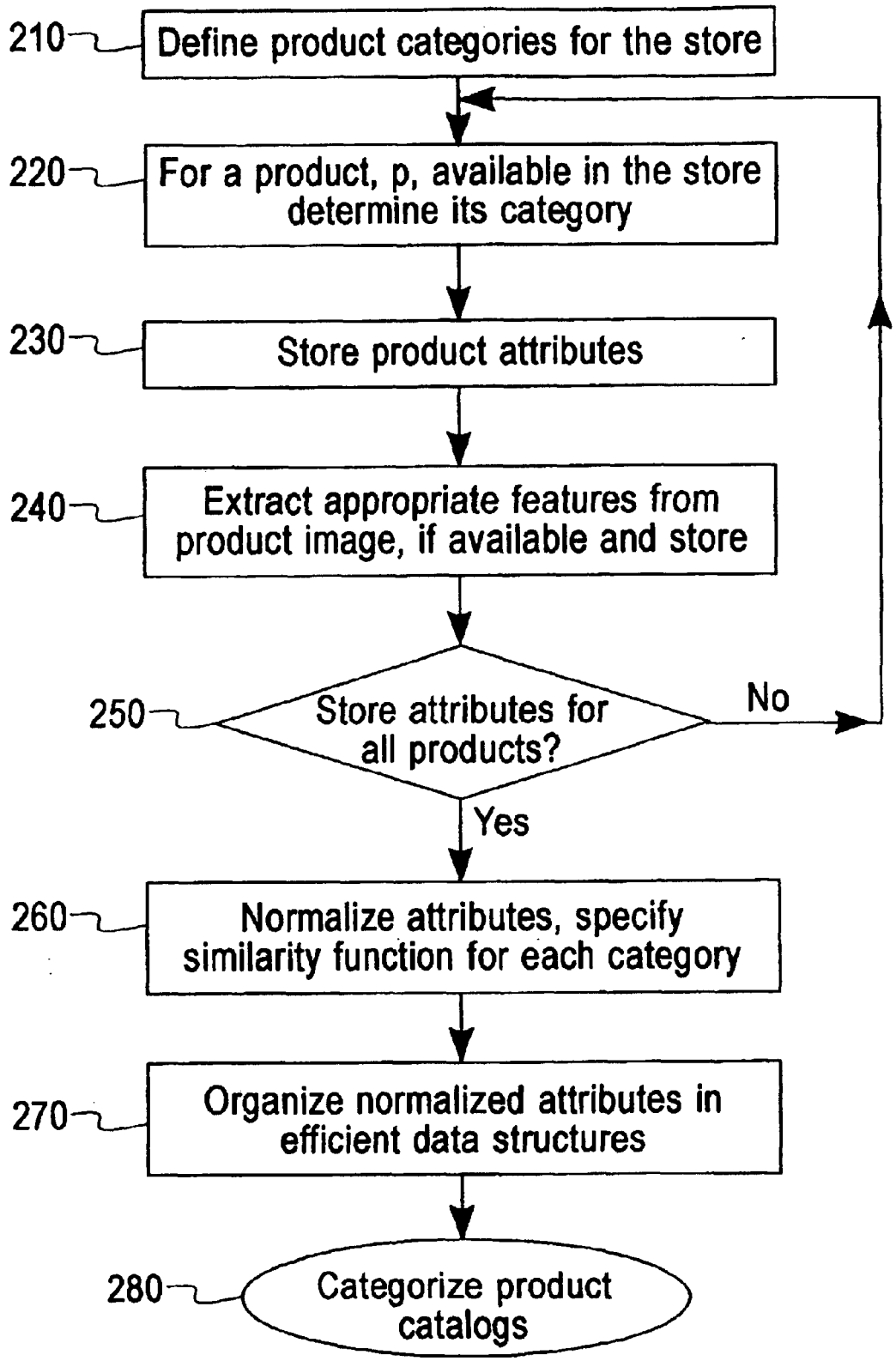
FIG. 2 is a flowchart illustrating the steps involved in creating a product catalog which is searched according to an embodiment of the invention.

With reference to FIGS. 1 and 2, the processes of catalog creation and interactive similarity searching during a shopping session are described as shown in FIG. 2. Catalog creation is an off-line task, that is, it does not happen during a shopping session. It is performed initially prior to executing a number of shopping session searches. Initially, product categories are defined in step 210. The catalog organises the products using categories, for example, electronics, apparels, shoes, jewellery, toys etc.

The next step 220 is the appropriate determination of the categories and this is generally governed by the existing, often intuitive, categorisation of products. For each product that has to be added to the product catalog, the category to which it belongs is determined. Based on that category, detailed attributes (features) are determined that will be used to characterize the product. These attributes are such that they capture all the essential detail about a product in which any prospective shopper may generally be interested. These attributes extracted from products define a feature space with each attribute as a dimension. Once decided upon, the product attributes are stored in the catalog, in step 230.

In this feature space, each product is represented by a feature vector corresponding to the feature values extracted for it in step 240. The number and type of the features extracted for a given category may vary substantially from category to category. For example, the category of automobiles will be characterized by features such as model, horsepower, engine size, number of doors, height, width, length, tire size, acceleration, fuel consumption, accessories etc. while the category of apparels will include attributes like brand, style, colour, size, length etc.

When parameterization of the product is neither sufficient nor readily achieved, visual characteristics of the product can be used. The system extracts image features from the product image based on the category to which the product belongs. Examples of features include colour distribution, texture distribution, and shape descriptors for the product object. It may not be useful to extract visual features for all categories of products. The decision whether the category should support image search is taken by an expert aiding the catalog creation process. For example it may not be useful to select and extract features for images of grocery products and in fact use of visual features may turn out to be detrimental. These will then be described in sufficient detail through nominal and numeric attributes only. Further, some product image categories, for example, upholstery can be searched better with global texture features, computed using Gabor filter responses, while there are some image categories where global features do not work well and the images are first segmented using any of the prior-art image segmentation techniques, for example, images from the shoe category are first colour segmented and then colour and shape feature descriptors like mean and variance of RGB or HSV colour, colour moments, Fourier descriptors of boundary points, invariant shape moments etc. are computed for the segments in the image.

This process of attribute specification and visual feature selection and extraction is performed in step 250 for all products available at the time of catalog (database) creation. Typically, feature values in the database will have different ranges, for example, (maximum value over the entire database—minimum value over the entire database). Consequently, features with a larger range dominate over a feature with smaller range when, for example, Manhattan, Euclidean, or Mahalanobis distance metrics are used for determining the similarity between two products during the search phase.

Hence, after features have been extracted in step 50 for all the products, normalization of feature values is performed in step 260, that is, the feature values of numeric attributes within a product category are suitably transformed to ensure that they all lie within same numeric range. This ensures that none of the features are given undue importance when calculating similarity metrics. This process ensures that normalised attributes are stored in efficient data structures in step 270. Once this process is complete, data entry in the product catalog is finished, in step 280.

Product attributes may also be nominal in nature, for example, in the case of apparel, possible values for "style" are t-shirts, pants, skirts, jackets etc. Similarity between nominal data values is computed using simple matching coefficients or other non-variant coefficients as described by Leonard Kaufman, and Peter Rousseeuw in *Finding Groups in Data: An Introduction to Cluster Analysis*, John Wiley and Sons, 1989.

During the search phase, similarity scores are computed for a target product in the catalog database and the shopper query. Similarity scores between two products are computed based on their numeric attributes, nominal attributes and image attributes. Different similarity functions can be used for numeric, nominal and image features. In a preferred embodiment different similarity functions are used for nominal and non-nominal attributes. These similarity scores are combined to give a single similarity score between the two products. The combination may be done using various schemes. The overall similarity S between a target product in database, x, and the query product, q, is computed as:

$$S(x,q) = \Sigma_j W_j \cdot S(f_j)$$

where the summation is over the various different similarity functions used for numeric, nominal and image features. In such a scheme, the weighting factors are determined based on the range of scores that are possible for each function and computing weighting factors to ensure that no one type of attributes take precedence over other types.

Feature normalization and determination of weighting factors for similarity functions are one-time processes done at database creation time. Addition or removal of a few products to the store usually does not significantly modify the statistical properties of the attribute database and hence, feature normalization and function weights need not be recomputed. However, when a large number of new products are added or deleted, these processes are desirably repeated on the modified database of attribute values. After the feature values for all attributes have been extracted and normalized, they are stored in a database using data structures that support efficient similarity searching. This is also known as indexing, and prior-art schemes like R*-trees, X-trees etc., may be used for supporting efficient searches in the high-dimensional attribute space.

Interactive Similarity Searching

Figure 3:
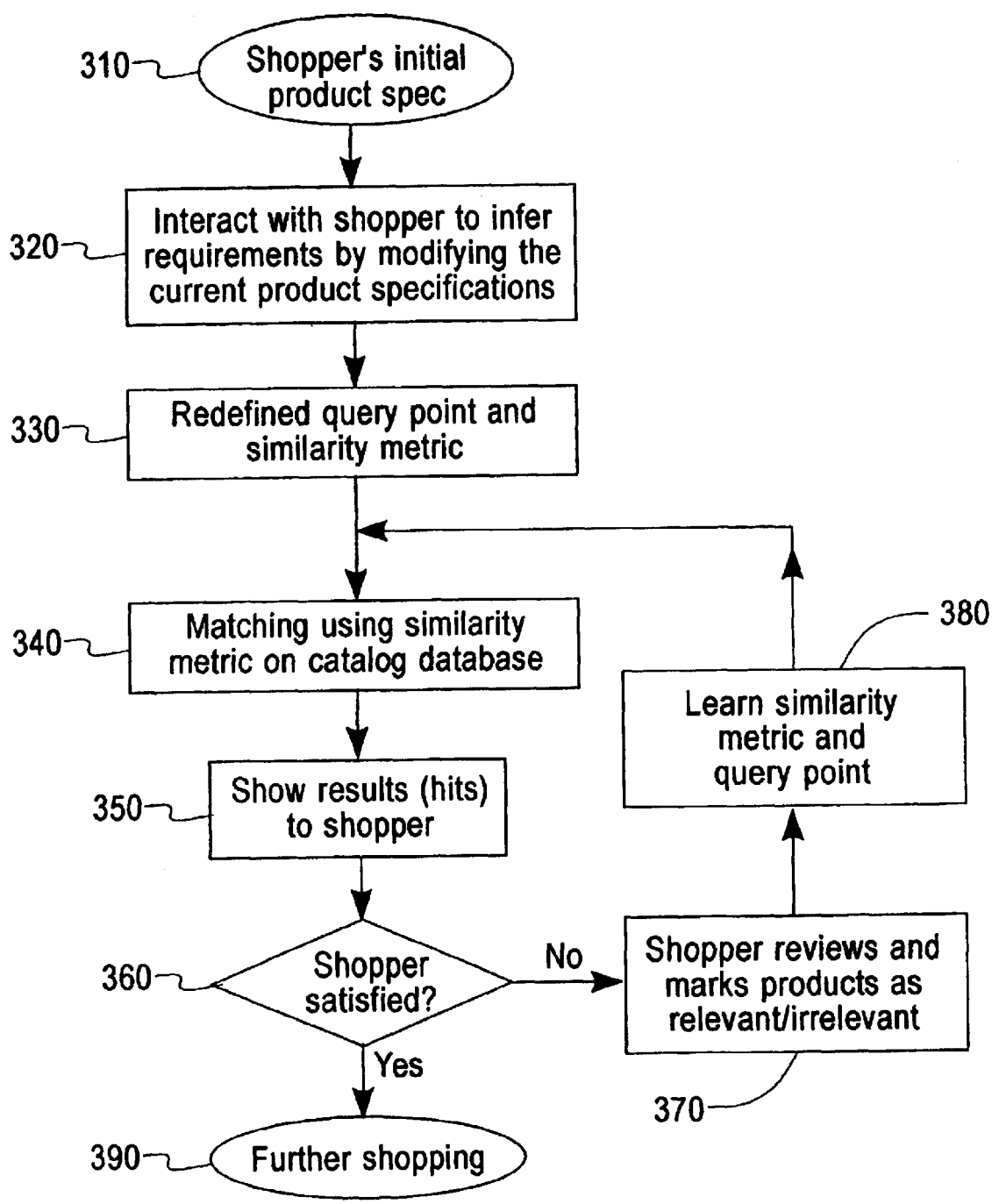
FIG. 3 is a flowchart illustrating the steps involved in performing a method according to an embodiment of the invention.

With reference to FIG. 3, a method of similarity searching in accordance with the embodiment is now described. The search for a product starts with the shopper selecting a product category or otherwise providing a product specification, in step 310. If the user knows the exact product identification number then the system looks for a product with the matching identification and presents the results to the shopper.

However, there are cases when the shopper does not know the exact product specification but is looking for a product similar to a particular product that the shopper specifies to the system. In such cases, the shopper may request the system to show products similar to a product selected by the shopper from the store catalog, for example, a shopper looking to buy a skirt may first choose the apparel category, select a floral skirt from the category and then ask the system to show apparel similar to the selected skirt.

The system allows conjunctive and disjunctive queries also, that is, the shopper can select multiple products from a category and either ask the system to find products that match "all" the selected products or those that match "any" of the selected products. In yet another scenario, the shopper may not select an existing product to begin the search. Instead, she specifies her requirements through the system's user interface that may consist of text entry regions, radio buttons, check boxes, drop down lists etc. The "query" product formed through the interface is used by the system to find products in the store that are similar to the query specification. For example, the user may ask the system to show products from the upholstery category that are "light coloured cotton checks 48 inches width" using the system's search interface.

Further, the system allows the shopper to upload a product image and select a region of the image for use along with the query, for example, the shopper may also give an image of her current upholstery while specifying her requirements to search for upholstery that has similar patterns.

The next step is determination of attribute values corresponding to the shopper's requirements. If the shopper selected some product for similarity searching, then the system retrieves the attributes for the selected product from its database. These attributes are used as the query vector during the similarity search in the product feature space. If the shopper specified the requirements through the user interface then these requirements are formulated into a query point.

The system uses the category of the products in which the shopper is interested and extracts the corresponding features from the image of the product if one was submitted by the shopper. Once the query point is determined, the goal of the system is to search for points in the feature space that are near this query point, a problem referred to as searching for K-nearest neighbours 340.

The system weights the different features appropriately to capture the shopper's preferences. For example, a shopper may be particular about the price range of a compact disc player but not care much about the frequency range of reproduction. In such a case, a weighted similarity search will give more weight to the price attribute and less weight to the frequency range attribute.

Existing commerce systems expect the shopper to give such preferences explicitly, that is, the shopper gives the weights for different attributes directly through the search engine's user interface. In the proposed commerce system, relevance feedback by the user is employed to automatically learn the weights that capture the shopper's requirements.

In the embodiment, the system retrieves and presents the K-nearest products using a similarity metric in step 350 and the user gives feedback in terms of relevant (good), irrelevant (bad) or don't care. The system learns from the user feedback in step 380 and modifies the similarity metric in such a way that the metric "fits" the relevant and irrelevant retrieved points better. This modified similarity metric is then used to retrieve from the database again and in general, these retrieval results will be closer to user's implied concept. The user may give feedback in step 370 and the iterative process can continue until the user is satisfied with the retrieval results, as per step 360. If so, the system is available for further shopping in step 390.

In the embodiment, the system uses equal weights for all attributes during the first iteration of step 340 and the weights are modified depending on user preferences inferred through user feedback. In this respect, it is found to be useful to modify the weights depending on user preferences inferred through user feedback using the methods described by Yoshiharu Ishikawa, Ravishankar Subramanya, and Christos Faloutsos, *MindReader: Querying Databases through Multiple Examples*, in Proceedings of the 24th International Conference on Very Large Data Bases (VLDB '98), New York, August 1998.

Product Specification Modification

Figure 4:
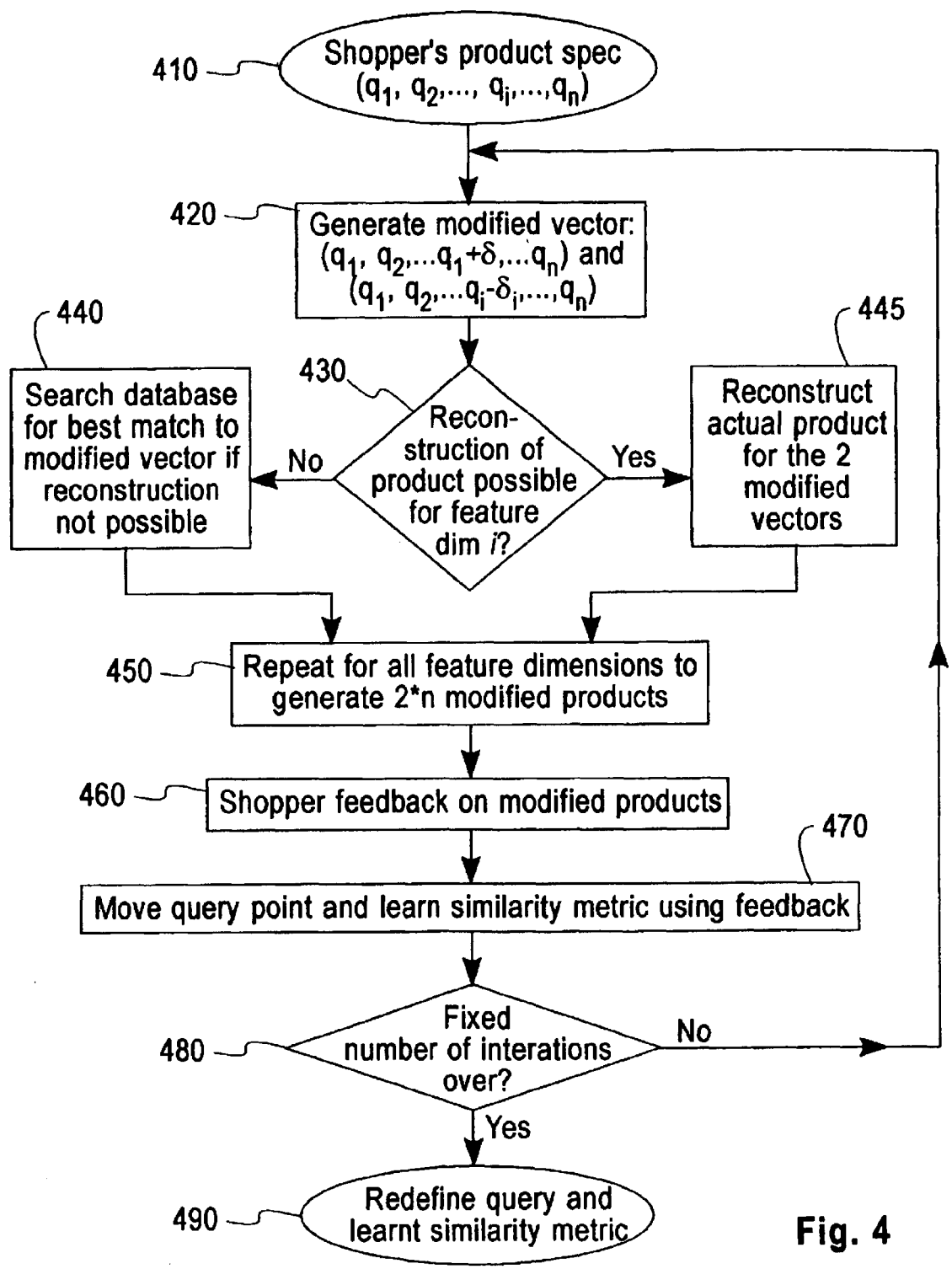
FIG. 4 is a flowchart illustrating the steps involved in tuning the similarity metric to the shopper's implied concept through relevance feedback according to an embodiment of the invention.

A preferred embodiment using interactive similarity searching with product specification modification is described with reference to FIG. 4. In this embodiment, when a similarity search is desired by the shopper, the proposed system does not start searching the catalog database for products similar to the shopper query immediately. Rather, it learns the shopper's implied requirements from the query itself, through interaction with the shopper as shown in FIG. 4.

In most cases, after a shopper submits a similarity search query, if she is shown a large number of "hits" (potential matches) that are mostly similar to each other then it causes confusion if they do not capture the shopper requirements, that is, the shopper's implied concept. The shopper may find it hard to make a decision since none of them may suit her and she will find it hard to give relevance feedback on a large number of potential matches. Further, this restricts the options that a shopper may want to have since the shopper cannot explore different products that are "quite similar to the initial query" but not "exactly similar."

The described embodiment takes a different approach that assists in product exploration and also in reducing the number of responses that a shopper has to give to the system for helping the system learn the shopper's implied concept. In the initial few iterations, the proposed system displays a small number of products to the shopper that are not the nearest neighbours of the shopper query. These products are quite different from each other and the query point as well.

This presentation of a small number of varied results assists in catalog exploration and helps the system orient its initial estimate of the similarity metric to the shopper's implied concept better. After these initial iterations, the system retrieves the nearest neighbour products from the catalog database using the re-positioned query point and the modified similarity metric that is expected to be closer to the shopper's implied concept than the metric used by the system at the start of the search process. If the shopper is not satisfied with the retrieved results, she may again give feedback on these, in order to further refine the similarity metric and retrieves products from the database using the new similarity metric. This iterative process continues until the shopper is satisfied with the results and selects some products for shopping or wishes to abort the search process.

The system assumes that the feature dimensions used to characterize a query vector are orthogonal to each other. Once the shopper submits a product specification in step 410 as the initial approximate requirement, the system takes the corresponding feature vector and generates in step 420 multiple feature vectors where each is different from the original query vector in only one feature dimension.

The system modifies each dimension by a fixed value that is determined for each feature dimension at the catalog database creation time using the statistical properties of each dimension in the database, for example, if the original query from the shopper was:

"type: sedan colour: red power: 120 hp engine: 2 ltr"

then the system generates multiple feature vectors including, for example, those listed below.

"type: sports colour: red power: 120 hp engine: 2 ltr"

"type: sedan colour: purple power: 120 hp engine: 2 ltr"

"type: sedan colour: red power: 100 hp engine: 2 ltr"

Once these multiple modified feature vectors are generated in step 430, the system determines the products corresponding to these feature vectors, and presents the modified specification/attribute in step 445. For example, if the query vector is "apparel: t-shirt colour: blue size: large style: checks"

then it may be possible to show a modified feature vector

"apparel: t-shirt colour: violet size: large style: checks".

However, in some cases, the feature attributes may not be able to be interpreted by a shopper, for example, product images may be characterized by some image features, such as colour moments or Gabor features to which a shopper is unable to relate.

In such cases, the system needs to determine a product that will approximately have the same modified feature vector in step 440. For other products, the system uses the modified feature vector and retrieves the most similar product from the database. This product is assumed to be best approximation to the modified feature vector and displayed to the shopper.

This process is repeated for all feature dimensions to generate 2 n modified products, as per step 450. The shopper then gives feedback in step 460 on the products corresponding to the modified feature vectors. This feedback is used to modify in step 470 the initial similarity metric. The preferred embodiment uses the Mahalanobis distance metric for numeric feature values. The query point movement and feature dimension re-weighting is done through the shopper's relevance feedback on modified products. After a few iterations of the significant modifications to the query point and shopper feedback on these as per step 480, the system retrieves the most similar products to the modified query point using the learnt similarity metric in step 490. The shopper may give further feedback on these K-nearest neighbours and this feedback is used by the system to refine the query point location and the similarity metric using relevance feedback techniques, as described above with reference to FIG. 3.

The process of catalog searching for similar products and iterative refinement of similarity metric continues until the shopper selects some products or stops the search process.

The embodiment also provides a capability to the shopper to manually modify the product attributes using the system's user interface before submitting the search query, for example, the shopper may first select a red coloured t-shirt from the catalog and then choose a colour from the colour-grid provided in the system's user interface to change the colour of the t-shirt to cyan. The system shows the effect of shopper's modification visually and hence it is easier for the shopper to see the changes and make a decision. This allows the shopper to start the search and shopping session with an approximate query.

Further, in scenarios where the shopping merchant also support customization of products, the shopper may "generate" descriptions of products that do not exist in the store catalog but those that the merchant may be prepared to manufacture according to the shopper requirements and possibly at an extra cost. For example, the store may not have a cyan coloured t-shirt in stock but may be willing to make one for the shopper.

Computer Implementation

Figure 5:
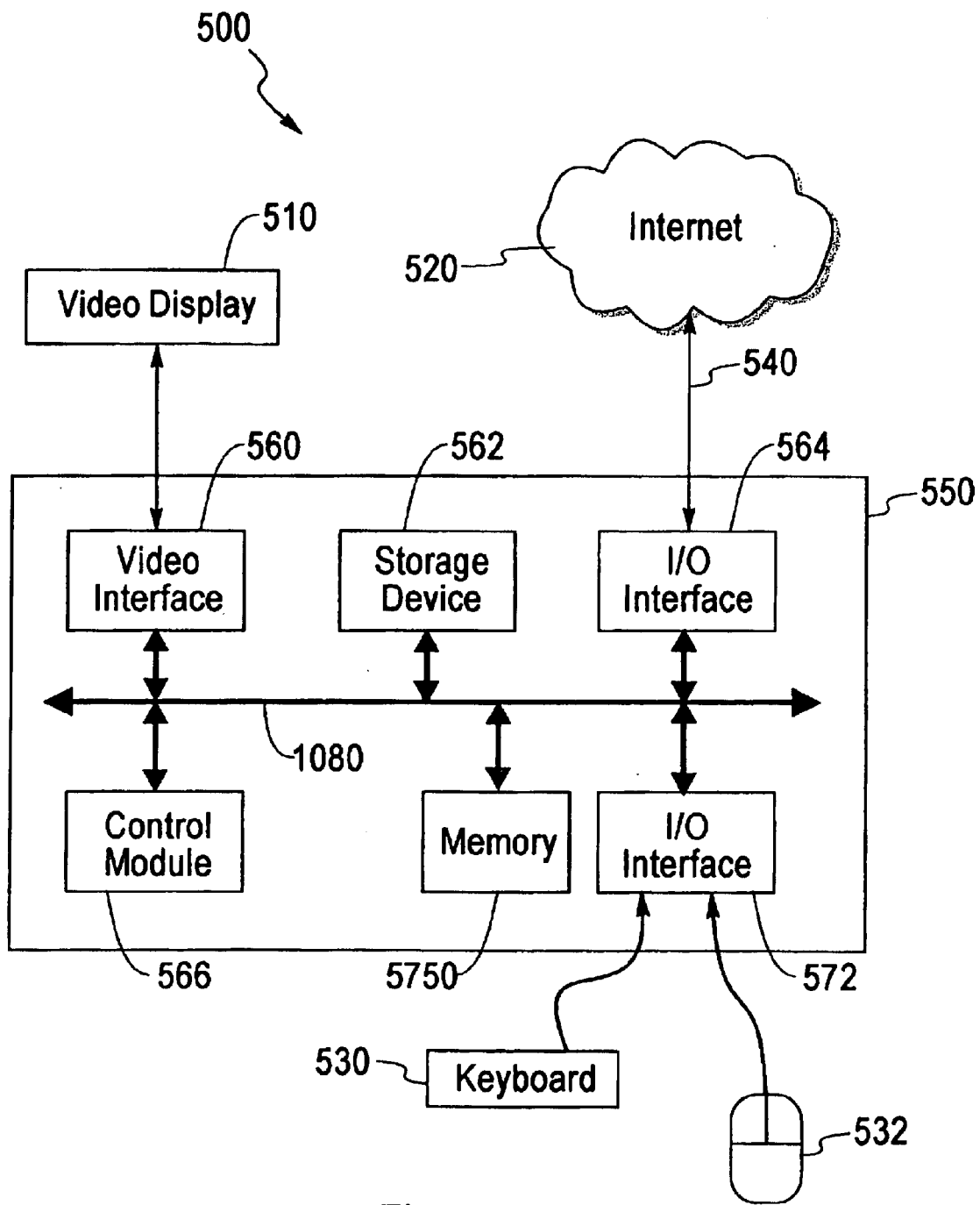
FIG. 5 is a schematic diagram of a computer system on which an embodiment of the invention may be implemented.

The described embodiment involves the use of computer databases and accordingly is implemented using a computer program product in conjunction with a computer system 500 as shown in FIG. 5. In particular, the methods can be performed using software, or computer readable program code, executing on the computer system 500.

The computer system 500 includes a computer 550, a video display 510, and input devices 530, 532. In addition, the computer system 500 can have any number of other output devices including line printers, laser printers, plotters, and other reproduction devices connected to the computer 550. The computer system 500 can be connected to one or more other computers via a communication input/output (I/O) interface 564 using an appropriate communication channel 540 such as a modem communications path, an electronic network, or the like. The network may include a local area network (LAN), a wide area network (WAN), an Intranet, and/or the Internet 520.

The computer 550 includes the control module 566, a memory 570 that may include random access memory (RAM) and read-only memory (ROM), input/output (I/O) interfaces 564, 572, a video interface 560, and one or more storage devices generally represented by the storage device 562. The control module 566 is implemented using a is central processing unit (CPU) that executes or runs a computer readable program code that performs a particular function or related set of functions.

The video interface 560 is connected to the video display 510 and provides video signals from the computer 550 for display on the video display 510. User input to operate the computer 550 can be provided by one or more of the input devices 530, 532 via the I/O interface 572. For example, a user of the computer 550 can use a keyboard as I/O interface 530 and/or a pointing device such as a mouse as I/O interface 532. The keyboard and the mouse provide input to the computer 550. The storage device 562 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 550 is typically connected to other devices via a bus 580 that in turn can consist of data, address, and control buses.

The method steps for searching product databases are effected by instructions in the software that are carried out by the computer system 500. Again, the software may be implemented as one or more modules for implementing the method steps.

In particular, the software may be stored in a computer readable medium, including the storage device 562 or that is downloaded from a remote location via the interface 564 and communications channel 540 from the Internet 520 or another network location or site. The computer system 500 includes the computer readable medium having such software or program code recorded such that instructions of the software or the program code can be carried out. The use of the computer system 500 preferably effects advantageous apparatuses for constructing a runtime symbol table for a computer program in accordance with the embodiments of the invention.

The computer system 500 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 566. Intermediate storage of the program code and any data including entities, tickets, and the like may be accomplished using the memory 570, possibly in concert with the storage device 562.

In some instances, the program may be supplied to the user encoded on a CD-ROM or a floppy disk (both generally depicted by the storage device 562), or alternatively could be read by the user from the network via a modem device connected to the computer 550. Still further, the computer system 500 can load the software from other computer readable media. This may include magnetic tape, a ROM or integrated circuit, a magneto-optical disk, a radio or infrared transmission channel between the computer and another device, a computer readable card such as a PCMCIA card, and the Internet 520 and Intranets including email transmissions and information recorded on Internet sites and the like. The foregoing are merely examples of relevant computer readable media. Other computer readable media may be practised without departing from the scope and spirit of the invention.

Embodiments of the invention can be realised in a centralised fashion in one computer system 500, or in a distributed fashion where different elements are spread across several interconnected computer systems. In particular, software may be executing at Internet servers that allow a number of users to remotely interrogate the database in accordance with the described embodiments.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

In the foregoing manner, a method, an apparatus, and a computer program product for product searching are disclosed. While only a small number of embodiments are described, it will be apparent to those skilled in the art in view of this disclosure that numerous changes and/or modifications can be made without departing from the scope and spirit of the invention.

We claim:

1. A method of providing to a user an interactive product search facility suitable for searching product information stored in a product catalog, the method comprising the steps of:

(a) providing a database of records respectively describing products, each of said records including a plurality of fields containing respective field values which characterize said products;

(b) receiving from a user a request to search said database of records in the form of a query based on one or more of said fields;

(c) providing to the user an initial set of similar search records found as a result of a similarity search based on said search request;

(d) receiving from the user relevance feedback as to which of said similar search records are of greater and/or lesser relevance to the user compared with other similar search records; and (e) providing to the user a modified set of similar search results found as a result of a similarity search based on (i) said search request, and (ii) said relevance feedback, said modified set of similar search results providing to the user records which are generally of greater relevance to the user than said initial set of similar search results, wherein the provision of similar search results is performed with the assistance of similarity functions, and wherein different similarity functions are used for different types of products attributes.

2. The method as claimed in claim 1, wherein the provision of similar search records involves a combination of two or more different types of product attributes, including numeric, nominal and image-based product attributes.

3. The method as claimed in claim 1, wherein the similarity function used for numeric products attributes is Mahalanobis distance.

4. The method as claimed in claim 3, wherein the Mahalanobis distance is a weighted Euclidean distance measure.

5. The method as claimed in claim 4, wherein to calculate the weighted Euclidean distance measure, relative weights are assigned to respective product attributes to represent the relative importance of that attribute in the similarity function.

6. The method as claimed in claim 5, wherein the relevance feedback received from the user is used to automatically adjust the relative weights assigned to respective product attributes.

7. The method as claimed in claim 1, wherein the relevance feedback involves an indication from the user, for one or more of the results in the set of similar search results, at least whether the result is relevant or irrelevant.

8. The method as claimed in claim 1, wherein steps (c) and (d) are iteratively performed a plurality of times.

9. The method as claimed in claim 1, wherein the initial set of similar search results includes K-nearest neighbors found as a result of the similarity search.

10. The method as claimed in claim 1, wherein the initial set of similar search results includes search results that are markedly different from each other and the query point, and are selected to assist in orienting the similarity function to the shopper's implied concept.

11. A method of providing to a user an interactive product search facility suitable for searching product information stored in a product catalog, the method comprising the steps of:

(a) providing a database of records respectively describing products, each of said records including a plurality of fields containing respective field values which characterize said products;

(b) receiving from a user a request to search said database of records in the form of a query based on one or more of said fields;

(c) providing to the user an initial set of similar search records found as a result of a similarity search based on said search request;

(d) receiving from the user relevance feedback as to which of said similar search records are of greater and/or lesser relevance to the user compared with other similar search records; and (e) providing to the user a modified set of similar search results found as a result of a similarity search based on (i) said search request, and (ii) said relevance feedback, said modified set of similar search results providing to the user records which are generally of greater relevance to the user than said initial set of similar search results, wherein on the basis of the relevance feedback, the similarity function, or parameters thereof, are modified so that the results of the modified similarity search provide the modified set of similar search results which better matches those of the initial set of similar search results designated relevant or irrelevant.

12. A method of providing to a user an interactive product search facility suitable for searching product information stored in a product catalog, the method comprising the steps of:

(a) providing a database of records respectively describing products, each of said records including a plurality of fields containing respective field values which characterize said products;

(b) receiving from a user a request to search said database of records in the form of a query based on one or more of said fields;

(c) providing to the user an initial set of similar search records found as a result of a similarity search based on said search request;

(d) receiving from the user relevance feedback as to which of said similar search records are of greater and/or lesser relevance to the user compared with other similar search records; and (e) providing to the user a modified set of similar search results found as a result of a similarity search based on (i) said search request, and (ii) said relevance feedback, said modified set of similar search results providing to the user records which are generally of greater relevance to the user than said initial set of similar search results, wherein before providing an initial set of similar search results, the following steps are performed:

(i) generating a number of similar product specifications by modifying one product attribute for each such product specification; and (ii) receiving relevance feedback for one or more of these modified product specification, in order to adjust the query point and learn the similarity metric that is most suitable, prior to conducting a similarity search on the basis of said search request.

13. A program storage device readable by computer, tangibly embodying a program of instructions executable by said computer to perform a method of providing to a user an interactive product search facility suitable for searching product information stored in a product catalog, the method comprising the steps of:

(a) providing a database of records respectively describing products, each of said records including a plurality of fields containing respective field values which characterize said products;

(b) receiving from a user a request to search said database of records in the form of a query based on one or more of said fields;

(c) providing to the user an initial set of similar search records found as a result of a similarity search based on said search request;

(d) receiving from the user relevance feedback as to which of said similar search records are of greater and/or lesser relevance to the user compared with other similar search records; and (e) providing to the user a modified set of similar search results found as a result of a similarity search based on (i) said search request, and (ii) said relevance feedback, said modified set of similar search results providing to the user records which are generally of greater relevance to the user than said initial set of similar search results, wherein the provision of similar search results is performed with the assistance of similarity functions, and wherein different similarity functions are used for different types of product attributes.

14. The program storage device as claimed in claim 13, wherein the provision of similar search records involves a combination of two or more different types of product attributes, including numeric, nominal and image-based product attributes.

15. The program storage device as claimed in claim 13, wherein the similarity function used for numeric product attributes is Mahalanobis distance.

16. The program storage device as claimed in claim 15, wherein the Mahalanobis distance is a weighted Euclidean distance measure.

17. The program storage device as claimed in claim 16, wherein to calculate the weighted Euclidean distance measure, relative weights are assigned to respective product attributes to represent the relative importance of that attribute in the similarity function.

18. The program storage device as claimed in claim 17, wherein the relevance feedback received from the user is used to automatically adjust the relative weights assigned to respective product attributes.

19. The program storage device as claimed in claim 13, wherein the relevance feedback involves an indication from the user, for one or more of the results in the set of similar search results, at least whether the result is relevant or irrelevant.

20. The program storage device as claimed in claim 13, wherein steps (c) and (d) are iteratively performed a plurality of times.

21. The program storage device as claimed in claim 13, wherein the initial set of similar search results includes K-nearest neighbors found as a result of the similarity search.

22. The program storage device as claimed in claim 13, wherein the initial set of similar search results includes search results that are markedly different from each other and the query point, and are selected to assist in orienting the similarity function to the shopper's implied concept.

23. An apparatus searching product catalogs, the apparatus comprising:

(a) a first unit operable for providing a database of records respectively describing products, each of said records including a plurality of fields containing respective field values which characterize said products;

(b) a second unit operable for receiving from a user a request to search said database of records in the form of a query based on one or more of said fields;

(c) a third unit operable for providing to the user an initial set of similar search records found as a result of a similarity search based on said search request;

(d) a fourth unit operable for receiving from the user relevance feedback as to which of said similar search records are of greater and/or lesser relevance to the user compared with other similar search records; and (e) a fifth unit operable for providing to the user a modified set of similar search results found as a result of a similarity search based on (i) said search request, and (ii) said relevance feedback, said modified set of similar search results provides to the user records which are generally of greater relevance to the user than said initial set of similar search results, wherein the provision of similar search results is performed with the assistance of similarity functions, and wherein different similarity functions are used for different types of product attributes.

24. The apparatus as claimed in claim 23, wherein the provision of similar search records involves a combination of two or more different types of product attributes, including numeric, nominal and image-based product attributes.

25. The apparatus as claimed in claim 23, wherein the similarity function used for numeric product attributes is Mahalanobis distance.

26. The apparatus as claimed in claim 25, wherein the Mahalanobis distance is a weighted Euclidean distance measure.

27. The apparatus as claimed in claim 23, wherein the initial set of similar search results includes search results that are markedly different from each other and the query point, and are selected to assist in orienting the similarity function to the shopper's implied concept.

* * * * *